(12) United States Patent
Lei et al.

(10) Patent No.: US 9,898,443 B2
(45) Date of Patent: Feb. 20, 2018

(54) METHOD AND SYSTEM FOR WEBPAGE PROCESSING

(71) Applicant: SHENZHEN SKYWORTH-RGB ELECTRONIC CO., LTD, Shenzhen (CN)

(72) Inventors: Xiao Lei, Shenzhen (CN); Zhiguo Wang, Shenzhen (CN); Peng Liu, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 15/124,221

(22) PCT Filed: Sep. 15, 2015

(86) PCT No.: PCT/CN2015/089581
§ 371 (c)(1),
(2) Date: Sep. 7, 2016

(87) PCT Pub. No.: WO2016/183973
PCT Pub. Date: Nov. 24, 2016

(65) Prior Publication Data
US 2017/0109327 A1    Apr. 20, 2017

(30) Foreign Application Priority Data
May 20, 2015 (CN) .......................... 2015 1 0258568

(51) Int. Cl.
*G06F 17/27* (2006.01)
*G06F 3/16* (2006.01)
(Continued)

(52) U.S. Cl.
CPC ............ *G06F 17/218* (2013.01); *G06F 3/165* (2013.01); *G06F 17/212* (2013.01);
(Continued)

(58) Field of Classification Search
CPC ................................. G06F 17/218; G06F 3/165
See application file for complete search history.

(56) References Cited

U.S. PATENT DOCUMENTS

| 8,998,720 | B2 * | 4/2015 | Dinka | H04L 67/10 463/24 |
| 9,148,608 | B2 * | 9/2015 | Wang | H04N 5/4403 |

(Continued)

FOREIGN PATENT DOCUMENTS

| CN | 102799693 A | 11/2012 |
| CN | 103544008 A | 1/2014 |

(Continued)

OTHER PUBLICATIONS

The World Intellectial Property Organization (WIPO) International Search Report for PCT/CN2013/083581 dated Feb. 18, 2016 pp. 1-7.

*Primary Examiner* — Scott Baderman
*Assistant Examiner* — Mario M Velez-Lopez
(74) *Attorney, Agent, or Firm* — Anova Law Group, PLLC (57) ABSTRACT

The present invention discloses a method for webpage processing and the system thereof, which comprises steps of: when a handheld device is visiting an HTML text file, the file will be parsed, addresses of multimedia contents in the file will be separated according to the current tag, and composed into a corresponding playlist, before distributed to a plurality of matched devices, while the HTML text file will be reorganized after the separation; the handheld device then opens the reorganized HTML file and shows the corresponding text format webpage, while a playback device plays the corresponding multimedia contents. The present invention takes full advantages of the playing back functions of each family used playback device, to play multimedia content, while a handheld device is used to show the text information (Continued)

only, and a playback device plays the corresponding multimedia contents, according to the type of data it is suitable to deal with.

15 Claims, 4 Drawing Sheets

(51) Int. Cl.
    *G06F 17/21*     (2006.01)
    *G06F 17/30*     (2006.01)
    *G06F 17/22*     (2006.01)

(52) U.S. Cl.
    CPC ........ *G06F 17/2247* (2013.01); *G06F 17/272* (2013.01); *G06F 17/30053* (2013.01); *G06F 17/30887* (2013.01); *G06F 17/30896* (2013.01)

(56) References Cited

U.S. PATENT DOCUMENTS

| | | | |
|---|---|---|---|
| 9,201,627 B2 * | 12/2015 | Tam | G06F 3/1454 |
| 9,386,191 B2 * | 7/2016 | Burridge | H04N 5/04 |
| 9,794,629 B2 * | 10/2017 | Matsubara | H04N 21/4622 |
| 2008/0154889 A1 * | 6/2008 | Pfeiffer | G06F 17/3084 |
| 2009/0204677 A1 * | 8/2009 | Michaelis | G06F 17/30867 |
| | | | 709/206 |
| 2009/0288132 A1 * | 11/2009 | Hegde | G08C 17/02 |
| | | | 725/141 |
| 2015/0293995 A1 * | 10/2015 | Chen | G06F 17/30029 |
| | | | 707/706 |

FOREIGN PATENT DOCUMENTS

| | | | |
|---|---|---|---|
| CN | 104217024 A | 12/2014 | |
| WO | WO 2007004086 A1 * | 1/2007 | ......... H04L 67/2823 |

* cited by examiner

METHOD AND SYSTEM FOR WEBPAGE PROCESSING

CROSS-REFERENCES TO RELATED APPLICATIONS

This application is a national stage application of PCT Patent Application No. PCT/CN 2015/089581, filed on 15 Sep. 2015, which claims priority to Chinese Patent Application No. 2015102585688, filed on 20 May 2015, the content of all of which is incorporated herein by reference.

FIELD OF THE INVENTION

The present invention relates to the field of consumer electric products, and, more particularly, to a method and system for webpage processing based on multi-screen interactions.

BACKGROUND

Following the development of a plurality of devices including an intelligent TV, more and more TVs support a multi-screen interaction function, that is, a TV may share a plurality of contents with a plurality of mobile terminals, including a cell phone. An implementation method may include: 1, specific multi-screen interactive software is installed in a cell phone, so a user may transmit a piece of content in the cell phone to a TV; 2, a TV may transmit an image shown on the TV to a cell phone.

However, both current methods have a plurality of problems, in the method 1, the cell phone transmits a piece of whole screen content to the TV, or it needs a user to manually select a video for transmission, while each time, only one piece of content may be transmitted, and only specific page contents may be supported for transmission. When a user is visiting a piece of general webpage content, the video content will be impossible to transmit to a TV. In the method 2, contents in a cell phone is synchronizing with that in a TV, thus interactions with TV contents is impossible.

Therefore, the current technology needs to be improved and developed.

BRIEF SUMMARY OF THE DISCLOSURE

According to the above described defects, the purpose of the present invention is providing a webpage processing method and the system thereof, in order to solve the problems in the prior art of webpage processing methods, including that, the interaction is worse, the content for transmission is limited, and it is impossible to take fully advantages of other ancillary equipments.

In order to achieve the above mentioned goals, the technical solution of the present invention to solve the technical problems is as follows:

A webpage processing method, wherein, it comprises the following steps:

when a handheld device is visiting an HTML text file, the file will be parsed to separate an address of each piece of multimedia content in the file according to a current tag;

the separated addresses of multimedia contents are composed into a corresponding playlist, and distributed to a plurality of matched playback devices, while the HTML file left is reorganized after separation;

the handheld device opens the reorganized HTML file and displays a corresponding text format webpage, while a playback device plays the according multimedia content.

The said webpage processing method, wherein, before the step of parsing the file and separating an address of each piece of multimedia content in the file according to the current tag, when a handheld device is visiting an HTML text file, it further includes:

receiving from a playback device a broadcasted data type information that the playback device is suitable to process, and storing a matching table between each playback device and the data type it suits to process.

The said webpage processing method, wherein, before the step of the handheld device opening the reorganized HTML file and showing a corresponding text format webpage, while a playback device plays the according multimedia contents, it further comprises:

predefining a control instruction agreement between the handheld device and the playback device, and defining a plurality of different control instruction actions according to a plurality of different data types.

The said webpage processing method, wherein, before the step of parsing the file and separating an address of each piece of multimedia content in the file according to the current tag, when a handheld device is visiting an HTML text file, it further includes:

configuring a video parsing database on a server terminal, which obtains resource information online through a plurality of searching engines, and forms a big database including resource information and the according url addresses in the said video parsing database.

The said webpage processing method, wherein, the step of composing the separated addresses of multimedia contents into a corresponding playlist, and distributing to a plurality of matched playback devices, before reorganizing the HTML text file after separating, further includes specifically:

the handheld device visits the video parsing database, and obtains titles of the multimedia contents according to the url addresses, before composing a playlist of different data types.

The said webpage processing method, wherein, the step of the handheld device opening the reorganized HTML file and displaying the corresponding text format webpage, while a playback device plays a plurality of according multimedia contents, comprises specifically:

the handheld device establishes a streaming media transmission channel with each playback device;

the handheld device sends out a control instruction;

the playback device receives and parses the control instruction sent by the handheld device, determines the control instruction category and the control instruction data, before taking a plurality of appropriate actions.

The said webpage processing method, wherein, the handheld device obtains and visits the HTML text file through a separate program or through a browser plug-in.

The said webpage processing method, wherein, the step of parsing the file and separating an address of each piece of multimedia content in the file according to the current tag, when a handheld device is visiting an HTML text file, includes specifically:

A1, determining if the current tag is <AUDIO> or not, if it is, then the current tag is determined as an audio tag, and the url addresses of the audio data will be extracted before going to Step A5, otherwise, going to step A2;

A2, determining if the current tag is <EMB> or <OBJECT>, if it is, then the current tag is determined as a video tag, the url addresses of the video data are extracted, and the video data are divided into picture data and audio data, the url addresses of the picture data are extracted before going to step A6; the url addresses of the audio data are extracted before going to step A5; otherwise going to step A3;

A3, determining if the current tag is <VIDEO>, if it is, then the current tag is determined as a video tag, and the url addresses of the video data are extracted, then the video data are separated into picture data and audio data, the url addresses of the picture data are extracted before going to step A6; the url addresses of the audio data are extracted before going to step A5; otherwise going to step A4;

A4, determining if the current tag is <IMG> or not, if it is, then the current tag is determined as an image tag, the url addresses of the image data, are extracted before going to Step A6, otherwise, reorganizing the HTML text file;

A5, composing a playlist for audio data;

A6, composing a playlist for picture data and image data.

A webpage processing system, wherein, it comprises:

a parsing module, applied to parsing an HTML text file when a handheld device is visiting the HTML text file, and separating the addresses of multimedia contents in the file according to the current tag;

a distribution module, applied to composing the separated addresses of multimedia contents into a corresponding playlist, and distributing to the matched playback devices, while reorganizing the HTML text file after separation;

a multi-screen interaction module, applied to displaying the corresponding text webpage when the handheld device opens the reorganized HTML file, and applied for the playback device to playing the corresponding multimedia content.

The said webpage processing system, wherein, it further comprises:

a predefinition module, applied to predefining the control instruction agreement between the handheld device and the playback devices, defining different control instruction actions according to different data types.

The said webpage processing system, wherein, the said multi-screen interaction module comprises:

a channel establishing unit, applied for the handheld device to establishing a streaming media transmission channel with the playback devices;

a control instructions transmission unit, applied for the handheld device to transmitting control instructions;

an executing unit, applied for the playback devices to receiving and parsing the control instructions sent by the handheld devices, determining the control instruction category and the control instruction data, while executing the according actions.

Benefits: in the present invention, when a handheld device is visiting an HTML text file, the multimedia contents inside are separated and distributed into a plurality of playback devices, whose advantages in playback functions will be fully taken to play the multimedia contents, while a handheld device is used to display the text information only, and the user may control the playback process of the playback device through a playlist in the handheld device, therefore, an interaction function is increased.

DETAILED DESCRIPTION OF EMBODIMENTS

The present invention provides a webpage processing method and the system thereof, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
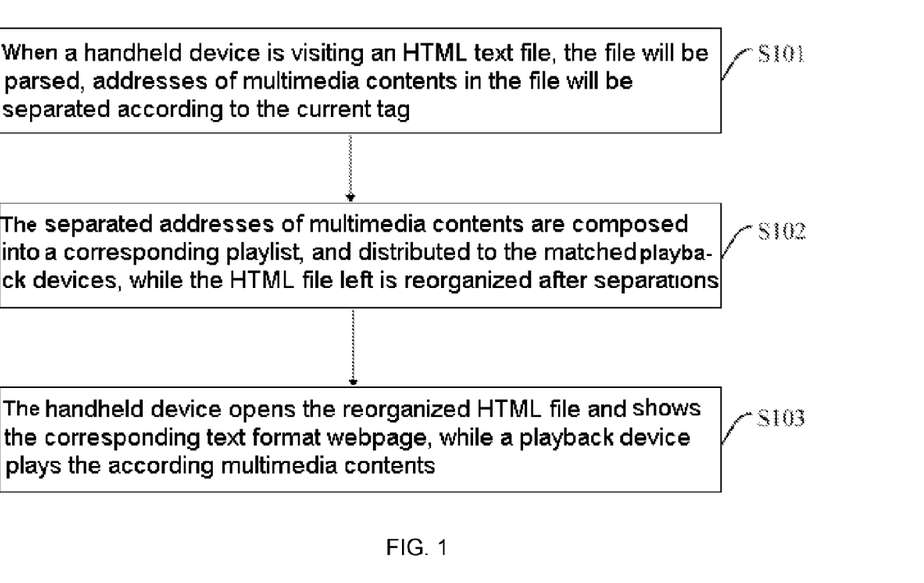
FIG. 1 illustrates a flow chart of a preferred embodiment of the webpage processing method as provided in the present invention.

A preferred embodiment of the webpage processing method provided in the present invention, as shown in FIG. 1, it comprises the following steps:

S101, when a handheld device is visiting an HTML text file, the file will be parsed to separate addresses of multimedia contents in the file according to the current tag;

S102, the separated addresses of multimedia contents are composed into a corresponding playlist, and distributed to a plurality of matched playback devices, while the HTML file left is reorganized after separations;

S103, the handheld device opens the reorganized HTML file and shows the corresponding text format webpage, while a playback device plays the according multimedia contents.

In the present invention, when a handheld device is visiting a webpage, it parses the HTML text file automatically, and distributes intelligently the addresses of multimedia contents such as images and videos in the HTML text file, to the playback devices such as TVs or stereos to play, while an explorer in the handheld device is used for text exploring of the webpage only.

Therefore, a webpage with multimedia contents is achieved to be shown in a plurality of screens, wherein, the handheld device is used for text browsing of the webpage only, while the TVs and stereos are used for multimedia contents playing of the webpage. The advantages of operating in this way are that, it is possible to take full advantages of devices including TVs, stereos and more, to play the multimedia contents in a webpage, also, it is possible to browse the text contents of a webpage on a handheld device.

In the present invention, the said playback device includes a plurality of display devices with a large screen, such as a TV and else, it may also include other supplementary home AV devices including a stereo device, it may further include other playback devices not mentioned, to play the appropriate contents. Therefore, it is possible to take full advantages of each playback device, in order to obtain a best experience.

Besides, the user may further control the playing processes of other playback devices through the handheld device, that is, the handheld device may not communicate with other playback devices, to execute operations such as switching images and videos, without operating a TV remote.

Further detailed descriptions of the methods of the present invention are stated here, taking a cell phone as an example of the handheld device. However, obviously, the said handheld device may not only be a cell phone, it may be other intelligent handheld devices, including a tablet PC.

First, when a cell phone goes online, it connects itself with playback devices in the network, which broadcast the data types they are suitable to process to the newly enrolled cell phone, and the cell phone saves the received playback devices information, including a matching list between each playback device and the data type it is suitable to process, which helps the cell phone distribute contents. For example, it may be a method of scanning a two-dimensional code, or it may be added by other programs. The said playback devices include large screen display devices (such as a TV), audio devices (such as a stereo) or others. These devices own better abilities in dealing with specific data formats, for example, a large-screen display device is suitable for videos or images playing, while an audio device is suitable for audio files playing.

Of course, the process of a cell phone connecting with other playing devices may also be executed before the cell phone distributing out contents, as long as during contents distribution process, connections are normally maintained between the cell phone and other playing devices.

Then, the cell phone visits the HTML text file.

The method of a cell phone obtaining an HTML text file may be one of the following two methods:

(1) obtains through an independent program: after the HTML file of a webpage online is caught, the webpage is parsed and separated, before the separated text webpage is displayed by an adopted browser, and links of the multimedia contents are transmitted to playing devices including TVs, to play the multimedia contents.

(2), obtains through a plug-in of the browser: the browser first obtains the HTML text file online, and starts the plug-in to execute processes first, right before displaying. At this time, the plug-in starts to work, and catches the HTML text file obtained by the browser, after parsing and separating, the text contents will be sent back to the browser (the Host) for displaying; then links of the multimedia contents are transmitted to playing devices including TVs, for playing.

Then, the cell phone parses the HTML text file, and distributes the contents. For the process of parsing contents of an HTML text file, the following classes of contents are separated:

Video Tags

In the latest HTML version of 5, the tag representing a piece of video content is <VIDEO>, representing a separated piece of audio content is <AUDIO>, through recognizing and comparing, it is possible to determine if the content of an HTML text file is an audio or a video.

If the webpage of a website is not in the version of HTML5, but an HTML in an old version, then an embedded video usually uses a tag of <EMB> or a tag of <OBJECT>. Through comparing the current tag, if it is <EMB> or <OBJECT>, that means it may be a video content.

After a piece of video content is parsed, it is possible to further extract separated audio data from the video content, separating the video content into picture data without voices and audio data alone.

Audio Tags

The tag for a piece of audio content alone is <AUDIO>, through comparing and recognizing if the current tag is <AUDIO>, it may be determined if a piece of content in the said HTML text file is a piece of audio content or not.

Image Tags.

The tag represents an image is <IMG>, through comparing and recognizing if the current tag is <IMG>, it may be determined if a piece of content in the said HTML text file is a piece of image content or not.

In such a way, the separated url addresses of the picture data without voices and the image data are composed into a picture data playlist and an image data playlist accordingly, before transmitting to a large-screen display device (such as a TV).

The url addresses of the separated audio data are also composed into an audio data playlist, before transmitting to an audio device.

In such a way, the present invention may fully utilize the functions of multiple playback devices at home, including using the large-screen display device to play the picture data, and using the audio devices to play the audio data.

Figure 2:
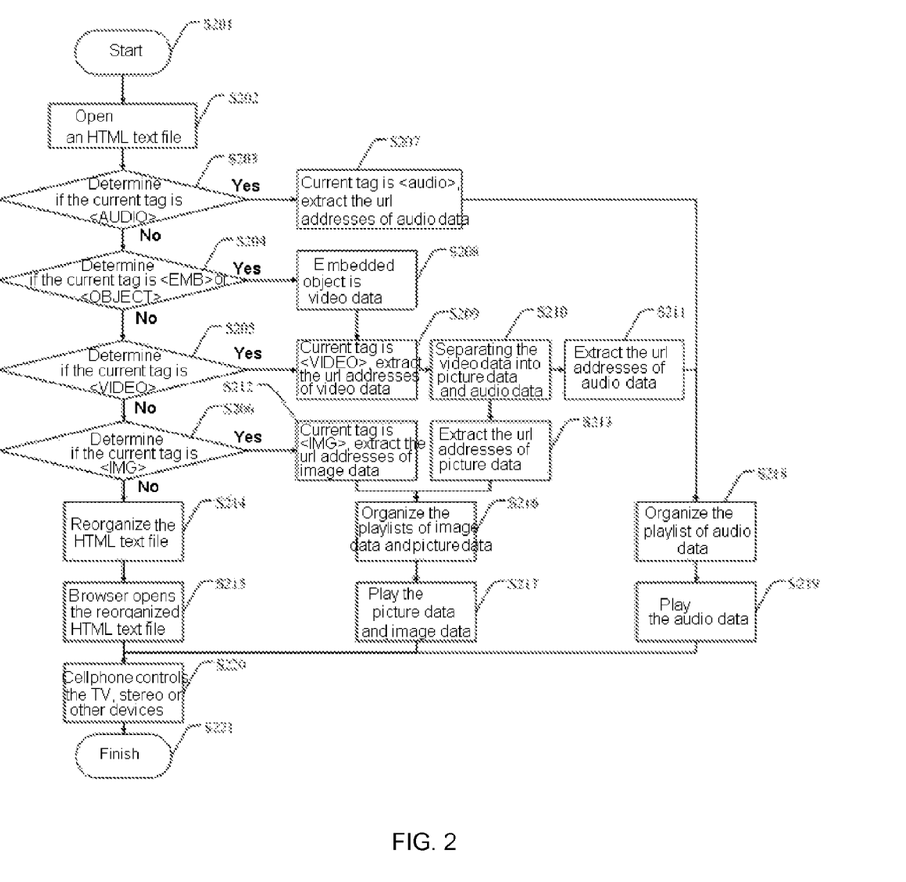
FIG. 2 illustrates a specific flow chart of a step S101 in the processes shown in FIG. 1.

Shown as FIG. 2, the said step S101 and step S102 may be further divided into the following steps:

S201, start;

S202, open an HTML text file;

S203, determine if the current tag is <AUDIO> or not, if it is, then go to step S207; otherwise go to step S204;

S204, determine if the current tag is <EMB> or <OBJECT>, if it is, go to step S208; otherwise go to step S205;

S205, determine if the current tag is <VIDEO> or not, if it is, go to step S209; otherwise go to step S206;

S206, determine if the current tag is <IMG> or not, if it is, go to step S212; otherwise go to step S214;

S207, when it is determined that the current tag is an audio tag, then extract the url addresses of the audio data, and go to step S218;

S208, when the embedded object is video data, go to step S209;

S209, when it is determined that the current tag is a video tag, then extract the url addresses of the video data, and go to step S210;

S210, separating the video data into picture data and audio data, then go to step S211 and step S213;

S211, extract the url addresses of audio data and go to step S218;

S212, when it is determined that the current tag is an image tag, then extract the url addresses of the image data, and go to step S216;

S213, extract the url addresses of picture data and go to step S216;

S214, reorganize the HTML text file, then go to step S215;

S215, the browser opens the reorganized HTML text file, then go to step S220;

S216, organize the playlists of both picture data and image data, then go to step S217;

S217, play the picture data and image data, then go to step S220;

S218, organize the playlist of audio data, then go to step S219;

S219, play the audio data, then go to step S220;

S220, control the TV, stereo or other devices with a cell phone, then go to step S221;

S221, end.

The order of steps S203, S204, S205, S206 for determinations is not limited, as long as determinations of different types of data can be achieved.

Further, in the present invention, when the url addresses are transmitted to other playback devices, it is not necessary to start transmissions after all the addresses have been fully parsed, it is possible to execute the parsing and transmission operations at the same time, and add the newly parsed url addresses to the end of the playlist, so as to improve the playback speed.

The cell phone reorganizes the HTML text file after separating the multimedia contents, and generates a new HTML text file. A browser in a handheld device is used to open the new HTML text file, and displays a webpage without any multimedia contents. Thus it is able to display the text contents neatly and beautifully in the handheld device. At the same time, the playlist is sent to playing devices including TVs and else, then the large-screen terminals including TVs, will play images, videos, and other contents.

Finally, playlists generated in a cell phone terminal comprise different data types of playlists, including picture data, audio data and image data types, and through the playlists, the corresponding operation interface or control page is reached.

After distributing the playlists for picture data or image data to a TV, or distributing the playlists for audio data to an audio device, a cell phone is needed to control the playing processes.

First, before a cell phone goes online, a video parsing database is configured on a server terminal, which obtains rich resources data online through searching engines, and forms a big database on resource information and the according url addresses inside.

A cell phone is applied to visiting the video parsing database based on the url addresses, names of different multimedia contents (each video, audio and else) are obtained, and different data types of playlists are composed.

<img id=1 src=phone.jpg></img>
<img id=1 src=sannianerban.jpg></img>
<img id=1 src=abc.jpg></img>
<video src=http://www.letv.com/football.mpg></video>
<video src=http://http://www.iqiyi.com/v_19rrnx1j40.swf></video>
<audio src=http://http://www.iqiyi.com/v_19rrnx1j40.mp3></video>

Above listed are a series of tags parsed, and the according url addresses are listed below:
http://www.letv.com/football.mpg>
http://www.iqiyi.com/v_19rrnx1 j40.swf
http://www.iqiyi.com/t_19rrnx1 j40.swf Titles of videos or audios obtained according to the url addresses are "TV movie xxx the 22nd", "Movie xxxx", "Music xxxx" and so on, which forms a playlist in the cell phone. One may enter an operation interface according to the corresponding content by clicking each content, that is, through the above said processes, not only the url addresses are displayed in the playlist, but also titles of the multimedia contents, so as to facilitate a user's control. If there are image tags contained in the parsing process, then a separate control page for images may be formed in the playlist.

The control process between the cell phone and other devices is as follows:

Pre-define a control instruction agreement between the handheld device and the playback devices.

Depending on different types, different control command protocols are predefined, that is, different control instruction actions are defined according to different data types, the protocol includes "header+control instruction action+control instruction data", while the parameter of "control instruction action" identifies a category of the control instruction, which includes a plurality of categories of touch control type, sensor type, text input type, video type, music type and image type.

Wherein, the category of touch control type mainly comprises the operations of phone screen touching.

The category of sensor type includes a gravity sensor or other sensors.

For the video type category, a general control instruction includes volumes addition and subtraction, progresses dragging, the previous and the next.

For the music type category, a general control instruction includes volumes addition and subtraction, progresses dragging, the previous and the next.

For the image type category, a general control instruction includes a clockwise rotation, a counter-clockwise rotation, the previous and the next, and so on.

Figure 3:
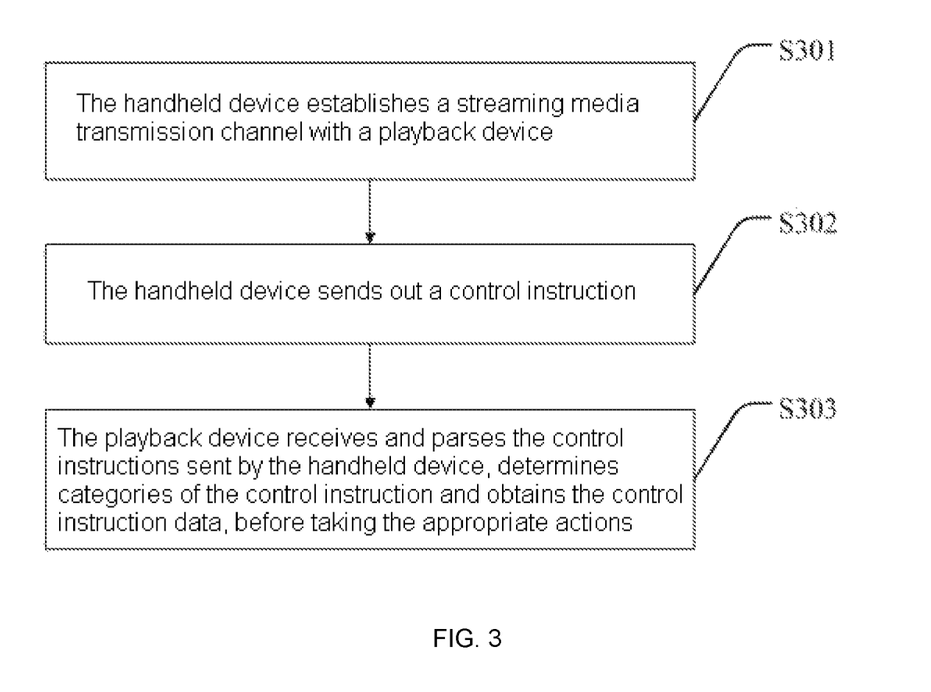
FIG. 3 illustrates a specific flow chart of a step S102 in the processes shown in FIG. 1.

As shown in FIG. 3, the said step S103 comprises specifically:

S301, the handheld device establishes a streaming media transmission channel with a playback device;

The cell phone establishes a streaming media transmission channel with TVs, stereos and other playback devices, via streaming media protocols.

S302, the handheld device sends out a control instruction;

A user may click a playlist shown in the handheld device, and goes to the corresponding content control interface to operate, in order to send out control instructions.

S303, the playback device receives and parses the control instruction sent by the handheld device, determines a category of the control instruction and obtains the control instruction data, before taking the appropriate actions.

TVs, stereos and other devices receive and parse the control instructions sent by the cell phone, determining the category of the control instruction, and obtaining the control instruction data. Then, the control instructions are executed by TVs, stereos, and other playback devices according to a predefined rule.

When writing a webpage browser program, if it is needed to display texts and multimedia contents in different screens, related arts disclosed in the present invention may be adopted. Or the arts may be applied into an operation of writing an application for multiple screens displaying, that is, when it is needed to write an application for multiple screens displaying texts and multimedia contents, related arts disclosed in the present invention may be adopted. Webpage contents are parsed first, then an existing browser is called to display text contents, while the multimedia contents are sent to a TV to play. Or an existing browser is modified and a plug-in functionality is added, to support multi-screen display. For example, when an existing browser supports a plug-in development, it may be applied into the plug-in of the related arts disclosed in the present invention, so that making the existing browser support multi-screen displays for text contents and multimedia contents.

Figure 4:
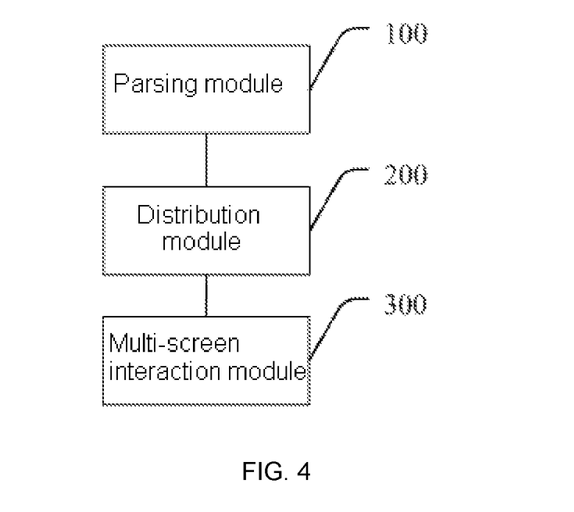
FIG. 4 illustrates a structural block diagram of a preferred embodiment of the webpage processing method as provided in the present invention.

Based on the above mentioned method, the present invention further provides a preferred embodiment for a webpage processing system, as shown in FIG. 4, which comprises:

A parsing module 100, applied to parsing an HTML text file when a handheld device is visiting the HTML text file, and separating the addresses of multimedia contents in the file according to the current tag;

A distribution module 200, applied to composing the separated addresses of multimedia contents into a corresponding playlist, and distributing to the matched devices, while reorganizing the HTML text file after separation;

A multi-screen interaction module 300, applied to showing the corresponding text webpage when the handheld device opens a recognized HTML file, and the playback device playing the corresponding multimedia content.

Further, the said playback device comprises a large-screen display device, and a stereo device.

Further, the webpage processing system comprises:

A predefinition module, applied to predefining the control instruction agreement between the handheld device and the playback devices, defining different control instruction actions according to different data types.

Figure 5:
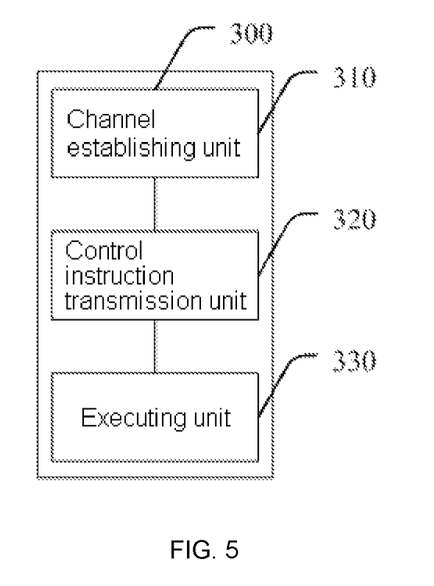
FIG. 5 illustrates a specific structural block diagram of a multi-screen interactive module in the system shown in FIG. 4.

As shown in FIG. 5, the said multi-screen interaction module 300 includes:

A channel establishing unit 310, applied for the handheld device to establishing a streaming media transmission channel with the playback devices;

A control instructions transmission unit 320, applied for the handheld device to sending control instructions;

An executing unit 330, applied for the playback devices to receiving and parsing the control instructions sent by the handheld devices, determining the control instruction category, and control instruction data, while executing the according actions.

Details of the above mentioned module units on the technical arts have been described specifically in the above mentioned methods, therefore, no more descriptions in details will be stated here again.

All above, when a handheld device is visiting an HTML text file, the multimedia contents inside are separated and distributed into a plurality of playback devices, whose advantages of playback functions will be fully taken to play the multimedia contents, while a handheld device is used to display the text information only, and the user may control the playback process of the playback device through a playlist in the handheld device, therefore, an interaction function is increased.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A webpage processing method, comprising: when a handheld device is visiting an HTML text file, parsing the HTML text file and separating an address of each piece of multimedia contents in the HTML text file according to a current tag; when the current tag is a video tag, separating a video data of the multimedia contents into a picture data and an audio data: composing the separated addresses of multimedia contents into a corresponding playlist, and distributing the playlist to a plurality of matched playback devices, while the HTML text file left is reorganized after separation; and opening, by the handheld device the reorganized HTML text file and displaying, by the handheld device, a corresponding text format webpage, while at least one playback device of the plurality of matched playback devices plays the multimedia contents; wherein the picture data and the audio data separated from the video data are composed to different playlists and distributed to different playback devices.

2. The webpage processing method according to claim 1, before the step of parsing the HTML text file and separating the address of each piece of multimedia content in the HTML text file according to the current tag, further comprising: when the handheld device is visiting the HTML text file, configuring a video parsing database on a server terminal, which obtaining a resource information online through a plurality of searching engines; and forming a big database including the resource information and the according an url addresses in a video parsing database.

3. The webpage processing method according to claim 2, the step of composing the separated addresses of multimedia contents into the corresponding playlist, and distributing the playlist to the plurality of matched playback devices, before reorganizing the HTML text file after separating, further comprising: visiting, by the handheld device, the video parsing database, and obtaining titles of the multimedia contents according to the url addresses, before composing the playlist of different data types.

4. The webpage processing method according to claim 1, wherein, the step of parsing the HTML text file and separating the address of each piece of multimedia contents in the HTML text file according to the current tag, comprises:

A1, determining if the current tag is <AUDIO> or not, if it is, then the current tag is determined as an audio tag, and the url addresses of the audio data will be extracted, before going to Step A5, otherwise, going to step A2;

A2, determining if the current tag is <EMB> or <OBJECT>, if it is, then the current tag is determined as the video tag, the url addresses of the video data are extracted, and the video data are divided into the picture data and the audio data, the url addresses of the picture data are extracted before going to step A6, the url addresses of the audio data are extracted before going to step A5, otherwise going to step A3;

A3, determining if the current tag is <VIDEO>, if it is, then the current tag is determined as the video tag, and the url addresses of the video data are extracted, then the video data are divided into the picture data and the audio data, the url addresses of the picture data are extracted before going to step A6, the url addresses of the audio data are extracted before going to step A5, otherwise going to step A4;

A4, determining if the current tag is <IMG> or not, if it is, then the current tag is determined as an image tag, the url addresses of the image data are extracted before going to Step A6, otherwise, reorganizing the HTML text file;

A5, composing the playlist for the audio data; and

A6, composing the playlist for the picture data and the image data.

5. A webpage processing method, comprising: when a handheld device is visiting an HTML text file, parsing the HTML text file and separating an address of each piece of multimedia contents in the HTML text file according to a current tag; when the current tag is a video tag, separating a video data of the multimedia contents into a picture data and an audio data; composing the separated addresses of multimedia contents into a corresponding playlist, and distributing the playlist to a plurality of matched playback devices, while the HTML text file left is reorganized after separation; opening, by the handheld device, the reorganized HTML text file and displaying, by the handheld device, a corresponding text format webpage, while at least one playback device of the plurality of matched playback devices plays the multimedia contents; before the step of parsing the HTML text file and separating the address of each piece of multimedia contents in the HTML text file according to the current tag, when the handheld device is visiting the HTML text file, receiving from the at least one playback device a broadcasted data type information that the at least one playback device is suitable to process, and storing a matching table between each playback device and the data type it suits to process; wherein the picture data and the audio data separated from the video data are composed to different playlists and distributed to different playback devices.

6. The webpage processing method according to claim 5, wherein, before the step of opening, by the handheld device, the reorganized HTML text file and displaying, by the handheld device, the corresponding text format webpage, further comprises: predefining a control instruction agreement between the handheld device and the at least one playback device, and defining a plurality of different control instruction actions according to a plurality of different data types.

7. The webpage processing method according to claim 6, further comprising: establishing a streaming media transmission channel between the handheld device and each playback device; sending out, by the handheld device, a control instruction; and receiving and parsing, by the playback device, the control instruction sent by the handheld device, and determining a control instruction category and a control instruction data, before taking a plurality of appropriate actions.

8. The webpage processing method according to claim 5, wherein, before the step of parsing the HTML text file and separating the address of each piece of multimedia contents in the HTML text file according to the current tag, when the handheld device is visiting the HTML text file, further comprises: configuring a video parsing database on a server terminal, obtaining a resource information online through a plurality of searching engines; and forming a big database including the resource information and an url addresses in the video parsing database.

9. The webpage processing method according to claim 6, wherein, the step of composing the separated addresses of multimedia contents into the corresponding playlist, and distributing to the plurality of matched playback devices comprises: visiting a video parsing database, by the handheld device, and obtaining names of the multimedia contents according to the url addresses, before composing a playlist of different data types.

10. The webpage processing method according to claim 5, wherein, before the step of parsing the HTML text file and separating the address of each piece of multimedia contents in the file according to the current tag, further comprises:
   A1, determining if the current tag is <AUDIO> or not, if it is, then the current tag is determined as an audio tag, and the url addresses of the audio data will be extracted, then going to Step A5, otherwise, going to step A2;
   A2, determining if the current tag is <EMB> or <OBJECT>, if it is, then the current tag is determined as the video tag, the url addresses of the video data are extracted, and the video data are separated into the picture data and the audio data, the url addresses of the picture data are extracted before going to step A6, the url addresses of the audio data are extracted before going to step A5, otherwise going to step A3;
   A3, determining if the current tag is <VIDEO>, if it is, then the current tag is determined as the video tag, and the url addresses of the video data are extracted, and the video data are divided into the picture data and the audio data, the url addresses of the picture data are extracted before going to step A6; the url addresses of the audio data are extracted before going to step A5; otherwise going to step A4;
   A4, determining if the current tag is <IMG> or not, if it is, then the current tag is determined as an image tag, the url addresses of the image data are extracted before going to Step A6, otherwise, reorganizing the HTML text file;
   A5, composing the playlist for the audio data; and
   A6, composing the playlist for the picture data and the image data.

11. The webpage processing method according to claim 6, wherein, before the step of parsing the HTML text file and separating the address of each piece of multimedia contents in the HTML text file according to the current tag, when the handheld device is visiting the HTML text file, further comprises: configuring a video parsing database on a server terminal, obtaining a resource information online through a plurality of searching engines; and forming a big database including the resource information and an url addresses in the video parsing database.

12. The webpage processing method according to claim 11, wherein, the step of composing the separated addresses of multimedia contents into the corresponding playlist, and distributing to a plurality of matched playback devices, comprises: visiting, by the handheld device, the video parsing database, and obtaining titles of the multimedia contents according to the url addresses, before composing a playlist of different data types.

13. A webpage processing system, comprising at least one processor, the at least one processor being configured for: parsing an HTML text file when a handheld device is visiting the HTML text file, and separating the addresses of multimedia contents in the HTML text file according to the current tag; when the current tag is a video tag, separating a video data of the multimedia contents into a picture data and an audio data; composing the separated addresses of the multimedia contents into a corresponding playlist, and distributing to the playback matched devices, while reorganizing the HTML text file after separation; displaying the corresponding text webpage when the handheld device opens the reorganized HTML text file, and playing, by the playback device, the corresponding multimedia contents; wherein the picture data and the audio data separated from the video data are composed to different playlists and distributed to different playback devices.

14. The webpage processing system according to claim 13, wherein, the at least one processor is further configured for: predefining a control instruction agreement between the handheld device and the playback devices, defining different control instruction actions according to different data types.

15. The webpage processing system according to claim 13, wherein, the at least one processor is further configured for: establishing, by the handheld device, a streaming media transmission channel with the playback devices; transmitting control instructions by the handheld device; receiving and parsing, by the playback devices, the control instructions sent by the handheld devices, determining the control instruction category and the control instruction data, while executing the according actions.

* * * * *